(12) United States Patent
Liu et al.

(10) Patent No.: US 11,823,482 B2
(45) Date of Patent: Nov. 21, 2023

(54) ULTRASONIC SENSOR, DISPLAY PANEL AND DISPLAY APPARATUS

(71) Applicant: BOE Technology Group Co., Ltd., Beijing (CN)

(72) Inventors: Yingming Liu, Beijing (CN); Xue Dong, Beijing (CN); Haisheng Wang, Beijing (CN); Xiaoliang Ding, Beijing (CN); Lei Wang, Beijing (CN); Pengpeng Wang, Beijing (CN); Changfeng Li, Beijing (CN); Peixiao Li, Beijing (CN); Chenyang Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 564 days.

(21) Appl. No.: 17/040,926

(22) PCT Filed: Apr. 26, 2020

(86) PCT No.: PCT/CN2020/087067
§ 371 (c)(1),
(2) Date: Sep. 23, 2020

(87) PCT Pub. No.: WO2020/228523
PCT Pub. Date: Nov. 19, 2020

(65) Prior Publication Data
US 2023/0122511 A1    Apr. 20, 2023

(30) Foreign Application Priority Data
May 16, 2019 (CN) ............................ 201910405303

(51) Int. Cl.
*G06V 40/13* (2022.01)
*G06F 3/043* (2006.01)

(52) U.S. Cl.
CPC ........ *G06V 40/1306* (2022.01); *G06F 3/0436* (2013.01)

(58) Field of Classification Search
CPC .......................... G06V 40/1306; G06F 3/0436
See application file for complete search history.

(56) References Cited

U.S. PATENT DOCUMENTS

2011/0121687 A1    5/2011  Aoki
2011/0215150 A1*   9/2011  Schneider .......... G06V 40/1306
                                                    235/439

(Continued)

FOREIGN PATENT DOCUMENTS

CN    102068276 A    5/2011
CN    104078452 A   10/2014

(Continued)

OTHER PUBLICATIONS

CN201910405303.4 first office action.

*Primary Examiner* — Amit Chatly
(74) *Attorney, Agent, or Firm* — IPro, PLLC (57) ABSTRACT

The present disclosure provides an ultrasonic sensor, a display panel and a display apparatus. The ultrasonic sensor includes: a bearing substrate; an ultrasonic emission structure on the bearing substrate, wherein the ultrasonic emission structure includes a first piezoelectric film layer; and an ultrasonic receiving structure on the bearing substrate, wherein the ultrasonic receiving structure includes a second piezoelectric film layer. The piezoelectric constant of the first piezoelectric film layer is greater than the piezoelectric constant of the second piezoelectric film layer.

19 Claims, 5 Drawing Sheets

(56) References Cited

U.S. PATENT DOCUMENTS

| | | | |
|---|---|---|---|
| 2014/0292941 A1 | 10/2014 | Kobayashi et al. | |
| 2018/0199917 A1* | 7/2018 | Zheng | A61B 8/4466 |
| 2019/0095015 A1* | 3/2019 | Han | G06V 40/1306 |
| 2019/0121460 A1* | 4/2019 | Ting | G06F 1/3262 |
| 2020/0242316 A1* | 7/2020 | Liu | H10N 30/85 |
| 2020/0356196 A1* | 11/2020 | Strohmann | G01S 7/52026 |

FOREIGN PATENT DOCUMENTS

| | | |
|---|---|---|
| CN | 205308749 U | 6/2016 |
| CN | 106709429 A | 5/2017 |
| CN | 106872583 A | 6/2017 |
| CN | 107194345 A | 9/2017 |
| CN | 107229909 A | 10/2017 |
| CN | 108960218 A | 12/2018 |
| CN | 109492461 A | 3/2019 |
| WO | 2011112622 A1 | 9/2011 |

* cited by examiner

ULTRASONIC SENSOR, DISPLAY PANEL AND DISPLAY APPARATUS

This application is a National Stage of International Application No. PCT/CN2020/087067, filed on Apr. 26, 2020, which claims priority to the Chinese Patent Application No. 201910405303.4, filed to the China National Intellectual Property Administration on May 16, 2019 and entitled "ULTRASONIC SENSOR AND DISPLAY PANEL", both of which are hereby incorporated by reference in their entireties.

FIELD

The present disclosure relates to the field of sensor technology, and particularly relates to an ultrasonic sensor, a display panel and a display apparatus.

BACKGROUND

With the rapid development of display technologies, electronic devices with biometric identification functions gradually enter people's lives and work. For example, an ultrasonic fingerprint identification technology is one of the more widely used technologies in the bioidentification technology.

However, in the ultrasonic fingerprint identification technology, an ultrasonic receiving structure and an ultrasonic emission structure in an ultrasonic sensor share a piezoelectric material, so that there is a problem of low emission performance, and the utilization of ultrasonic signals is relatively low.

SUMMARY

An ultrasonic sensor provided by the embodiments of the present disclosure includes:

a bearing substrate;

an ultrasonic emission structure on the bearing substrate, wherein the ultrasonic emission structure includes a first piezoelectric film layer; and an ultrasonic receiving structure on the bearing substrate, wherein the ultrasonic receiving structure includes a second piezoelectric film layer;

wherein a piezoelectric constant of the first piezoelectric film layer is greater than a piezoelectric constant of the second piezoelectric film layer.

Optionally, in the embodiments of the present disclosure, the ultrasonic emission structure and the ultrasonic receiving structure are on a same side of the bearing substrate.

Optionally, in the embodiments of the present disclosure, the ultrasonic emission structure is on a side, away from the bearing substrate, of the ultrasonic receiving structure.

Optionally, in the embodiments of the present disclosure, the ultrasonic sensor further includes:

a protective layer between the ultrasonic emission structure and the ultrasonic receiving structure; and a first electrode lead-out portion and a second electrode lead-out portion which are on a side, proximate to the ultrasonic emission structure, of the protective layer;

wherein the ultrasonic emission structure includes: a first electrode on a side, away from the bearing substrate, of the first piezoelectric film layer, and a second electrode on a side, proximate to the bearing substrate, of the first piezoelectric film layer;

wherein the first electrode lead-out portion is coupled to the second electrode, and the second electrode lead-out portion is coupled to the first electrode.

Optionally, in the embodiments of the present disclosure, the ultrasonic emission structure further includes: a first conductive connection portion coupled to the first electrode;

wherein one end of the first conductive connection portion is coupled to the first electrode, and the other end of the first conductive connection portion extends to the side, proximate to the bearing substrate, of the first piezoelectric film layer and is in direct contact with and coupled to the second electrode lead-out portion; the first conductive connection portion is insulated from the second electrode; and the second electrode is in direct contact with and coupled to the first electrode lead-out portion.

Optionally, in the embodiments of the present disclosure, the first conductive connection portion includes a silver colloid material.

Optionally, in the embodiments of the present disclosure, the ultrasonic emission structure further includes: a lead-out wire; wherein an edge of a side, proximate to the second electrode lead-out portion, of the first electrode exceeds the edge of the first piezoelectric film layer; the edge, exceeding the first piezoelectric film layer, of the first electrode is provided with a lead-out hole; one end of the lead-out wire is coupled to the second electrode lead-out portion, and the other end of the lead-out wire is coupled to the first electrode through the lead-out hole; and the second electrode is in direct contact with and coupled to the first electrode lead-out portion.

Optionally, in the embodiments of the present disclosure, the first electrode and the second electrode include a same metal material; and the first electrode lead-out portion and the second electrode lead-out portion include the same metal material.

Optionally, in the embodiments of the present disclosure, the first electrode and the first electrode lead-out portion include a same metal material.

Optionally, in the embodiments of the present disclosure, the ultrasonic sensor further includes:

a first electrode lead-out portion and a second electrode lead-out portion which are on a side, proximate to the ultrasonic emission structure, of the bearing substrate;

wherein the ultrasonic emission structure includes: a first electrode on the side, away from the bearing substrate, of the first piezoelectric film layer, and a second electrode on a side, proximate to the bearing substrate, of the first piezoelectric film layer;

wherein the first electrode lead-out portion is coupled to the second electrode, and the second electrode lead-out portion is coupled to the first electrode.

Optionally, in the embodiments of the present disclosure, the ultrasonic sensor further includes: a second conductive connection portion on the side, proximate to the ultrasonic emission structure, of the bearing substrate;

wherein the ultrasonic receiving structure includes: a third electrode on a side, away from the bearing substrate, of the second piezoelectric film layer, and a plurality of fourth electrodes on a side, proximate to the bearing substrate, of the second piezoelectric film layer;

wherein the third electrode is coupled to the first electrode lead-out portion, and the third electrode is in direct contact with and coupled to the second electrode; one end of the second conductive connection portion is coupled to the second electrode lead-out portion, and the other end of the second conductive connection portion is coupled to the first electrode; and the second conductive connection portion i insulated from the third electrode.

Optionally, in the embodiments of the present disclosure, the ultrasonic emission structure further includes: a first conductive connection portion coupled to the first electrode; wherein one end of the first conductive connection portion is coupled to the first electrode, and the other end of the first conductive connection portion extends to the side, proximate to the bearing substrate, of the first piezoelectric film layer and is in direct contact with and coupled to the second electrode lead-out portion; the first conductive connection portion is insulated from the second electrode.

Optionally, in the embodiments of the present disclosure, the first conductive connection portion includes a silver colloid material.

Optionally, in the embodiments of the present disclosure, the ultrasonic emission structure further includes: a lead-out wire;

wherein the edge of a side, proximate to the second electrode lead-out portion, of the first electrode exceeds the edge of the first piezoelectric film layer, and the edge, exceeding the first piezoelectric film layer, of the first electrode is provided with a lead-out hole;

wherein one end of the lead-out wire is coupled to the second electrode lead-out portion, and the other end of the lead-out wire is coupled to the first electrode through the lead-out hole.

Optionally, in the embodiments of the present disclosure, the second conductive connection portion includes: a material layer on the side, proximate to the ultrasonic emission structure, of the bearing substrate, and a metal layer on a side, away from the bearing substrate, of the material layer.

Optionally, in the embodiments of the present disclosure, a material of the material layer is the same as a material of the second piezoelectric film layer, and the material layer and the second piezoelectric film layer are disposed on a same layer.

Optionally, in the embodiments of the present disclosure, the first electrode and the second electrode include a same metal material; and the first electrode lead-out portion and the second electrode lead-out portion include the same metal material.

Optionally, in the embodiments of the present disclosure, the first electrode and the first electrode lead-out portion include a same metal material.

Optionally, in the embodiments of the present disclosure, a material of the first piezoelectric film layer is lead zirconate titanate piezoelectric ceramic or a piezoelectric electret material.

Correspondingly, the embodiments of the present disclosure further provide a display panel, including a display luminescent device, and the above-mentioned ultrasonic sensor on a side, away from a display surface, of the display luminescent device.

Correspondingly, the embodiments of the present disclosure further provide a display apparatus, including the above-mentioned display panel.

DETAILED DESCRIPTION OF THE EMBODIMENTS

Figure 1:
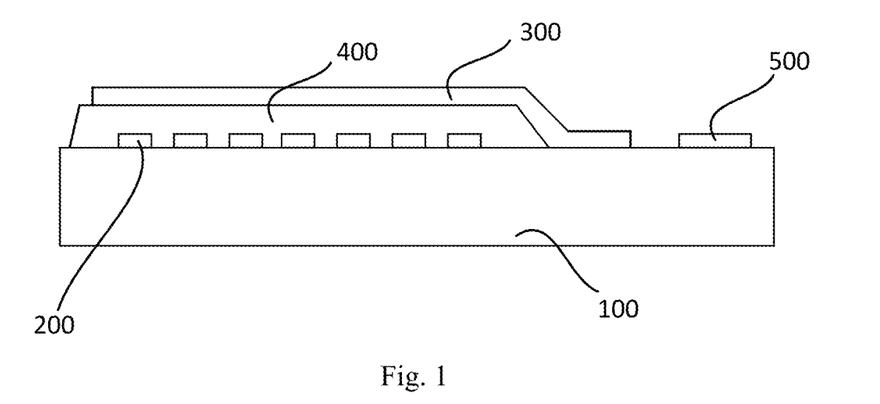
FIG. 1 is a sectional schematic diagram of an ultrasonic sensor provided by the related art.

In an ultrasonic fingerprint identification technology, as shown in FIG. 1, the ultrasonic sensor includes: a bearing substrate 100, and receiving electrodes 200 and an emission electrode 300 which are located on the bearing substrate 100, and a piezoelectric material layer 400 located between the receiving electrodes 200 and the emission electrode 300. The ultrasonic sensor is integrated with an ultrasonic emission structure and an ultrasonic receiving structure. At an ultrasonic emission phase, the ultrasonic sensor serving as the ultrasonic emission structure may deform the piezoelectric material layer 400 to generate ultrasonic waves by applying a square wave signal between the receiving electrodes 200 and the emission electrode 300. At an ultrasonic receiving phase, the ultrasonic sensor serving as the ultrasonic receiving structure may receive the ultrasonic waves by applying a fixed voltage signal to the emission electrode 300 and receiving output signals of the receiving electrodes 200. In addition, the bearing substrate 100 is also provided with a binding electrode 500, so that binding connection between the ultrasonic sensor and other devices can be realized through the binding electrode 500.

For the ultrasonic sensor shown in FIG. 1, the ultrasonic emission structure and the ultrasonic receiving structure share the piezoelectric material layer, so that there is a problem of low emission performance, and the utilization of ultrasonic signals is relatively low.

Based on this, the embodiments of the present disclosure provide an ultrasonic sensor, a display panel and a display apparatus.

The specific implementation modes of the ultrasonic sensor, the display panel and the display apparatus which are provided by the embodiments of the present disclosure will be described in detail below in conjunction with the accompanying drawings. The thicknesses and shapes of all film layers in the drawings do not reflect real scales, and are merely to illustrate the contents of the present disclosure.

Figure 2:
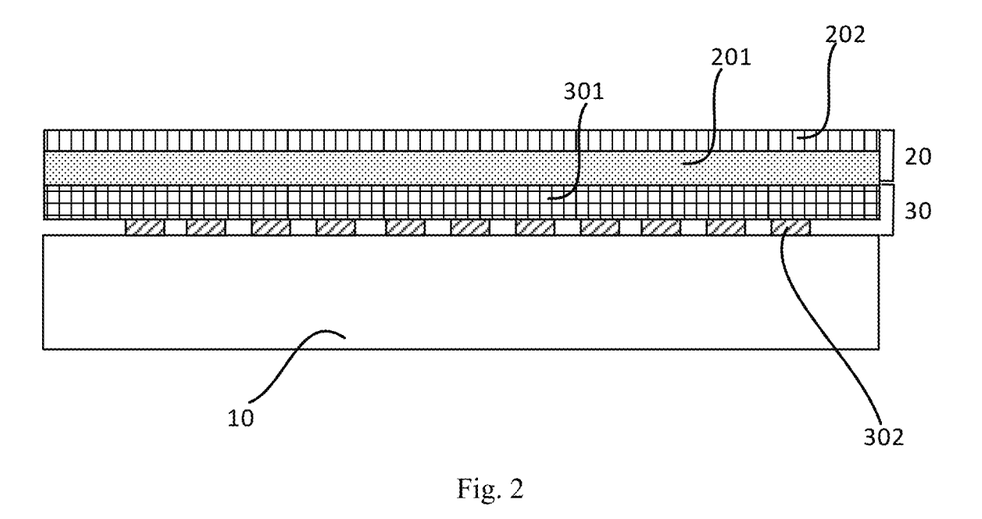
FIG. 2 is a sectional schematic diagram of an ultrasonic sensor provided by the embodiments of the present disclosure.

Referring to FIG. 2, an ultrasonic sensor provided by the embodiments of the present disclosure includes:

a bearing substrate 10;

an ultrasonic emission structure 20 on the bearing substrate 10, wherein the ultrasonic emission structure 20 includes a first piezoelectric film layer 201; and an ultrasonic receiving structure 30 on the bearing substrate 10, wherein the ultrasonic receiving structure 30 includes a second piezoelectric film layer 301;

wherein a piezoelectric constant of the first piezoelectric film layer 201 is greater than a piezoelectric constant of the second piezoelectric film layer 301.

According to the ultrasonic sensor provided by the embodiments of the present disclosure, the ultrasonic emission structure and the ultrasonic receiving structure respectively have different piezoelectric film layers. The ultrasonic emission structure includes the first piezoelectric film layer, the ultrasonic receiving structure includes the second piezoelectric film layer, and the piezoelectric constant of the first piezoelectric film layer is greater than the piezoelectric constant of the second piezoelectric film layer, so that the emission performance of the ultrasonic emission structure is higher, and the emission effect of the ultrasonic emission structure can be enhanced.

During specific implementation, in the ultrasonic sensor provided by the embodiments of the present disclosure, since the ultrasonic emission structure and the ultrasonic receiving structure respectively have different piezoelectric film layers, the ultrasonic emission structure may use a piezoelectric film layer with a relatively large piezoelectric constant. Specifically, the material of the first piezoelectric film layer 201 may be lead zirconate titanate piezoelectric ceramic PZT or a piezoelectric electret material. The material of the second piezoelectric film layer 301 may be polyvinylidene fluoride PVDF. For example, the piezoelectric constant of the lead zirconate titanate piezoelectric ceramic or the piezoelectric electret material is relatively large, so that the emission capacity of the ultrasonic emission structure may be higher. In some embodiments, in order to further enhance the emission effect of the ultrasonic emission structure 20, the first piezoelectric film layer 201 may also include a plurality of sub-film layers, and the material of each sub-film layer may be the lead zirconate titanate piezoelectric ceramic.

In the actual application, in the ultrasonic sensor provided by the embodiments of the present disclosure, referring to FIG. 2 as well, the ultrasonic emission structure 20 and the ultrasonic receiving structure 30 are located on the same side of the bearing substrate 10. In this way, when the ultrasonic sensor is combined with the display panel, the side, away from the ultrasonic emission structure 20, of the bearing substrate 10 can be attached to the side, away from a display surface, of the display panel, so that a display apparatus is obtained with ultrasonic fingerprint identification and touch functions.

Further, in the ultrasonic sensor provided by the embodiments of the present disclosure, as shown in FIG. 2, the ultrasonic emission structure 20 is located on the side, away from the bearing substrate 10, of the ultrasonic receiving structure 30.

When the ultrasonic sensor is combined with the display panel, the side, away from the ultrasonic emission structure 20, of the bearing substrate 10 can be attached to the side, away from the display surface, of the display panel; the ultrasonic emission structure 20 is arranged on the side, away from the bearing substrate 10, of the ultrasonic receiving structure 30, so that the ultrasonic receiving structure 30 can be closer to the display surface of the display panel. When a user touches the display surface of a display apparatus, the intensity of the ultrasonic waves received by the ultrasonic receiving structure 30 is relatively high, which makes fingerprint identification or touch detection more sensitive and accurate.

During specific implementation, since the ultrasonic receiving structure 30 is relatively closer to the bearing substrate 10, electrodes of the ultrasonic receiving structure 30 can be led out to the bearing substrate 10 to facilitate coupling between the ultrasonic receiving structure and other devices.

Since the ultrasonic emission structure 20 is relatively far from the bearing substrate 10, an electrode of the ultrasonic emission structure 20 cannot be directly led out to the bearing substrate 10, which causes that the ultrasonic emission structure 20 is difficultly coupled to other devices. In the embodiments of the present disclosure, an electrode lead-out manner for the ultrasonic emission structure is set to enable the ultrasonic emission structure to be coupled to other devices more easily, and will be described in detail below in conjunction with the accompanying drawings.

Figure 3:
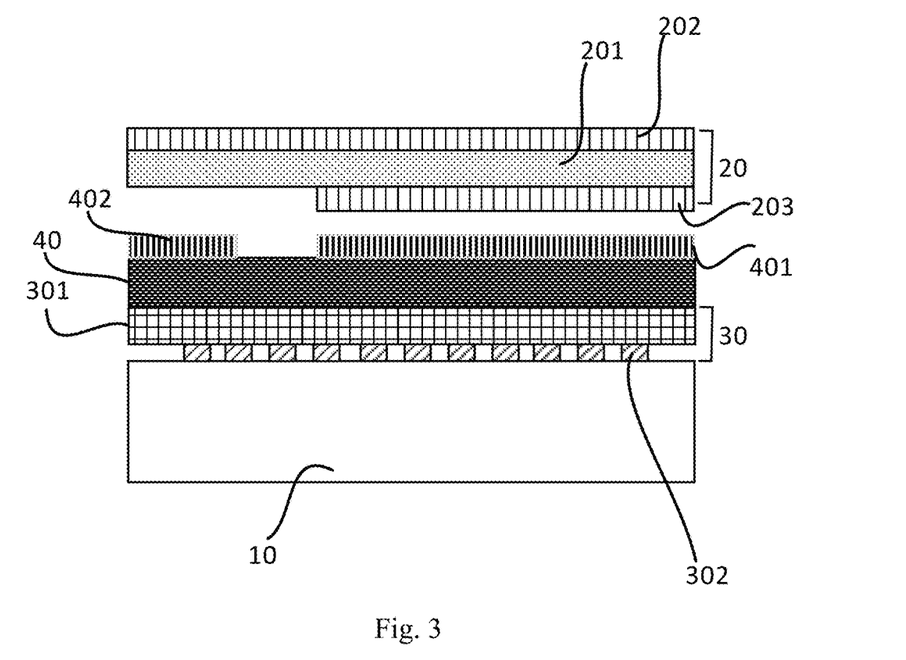
FIG. 3 is a sectional schematic diagram of an ultrasonic sensor provided by the embodiments of the present disclosure.

Referring to FIG. 3, the ultrasonic sensor provided by the embodiments of the present disclosure may further include: a protective layer 40 located between the ultrasonic emission structure 20 and the ultrasonic receiving structure 30, and a first electrode lead-out portion 401 and a second electrode lead-out portion 402 which are located on the side, proximate to the ultrasonic emission structure 20, of the protective layer 40.

The ultrasonic emission structure 20 includes: a first electrode 202 located on the side, away from the bearing substrate 10, of the first piezoelectric film layer 201, and a second electrode 203 located on the side, proximate to the bearing substrate 10, of the first piezoelectric film layer 201.

The first electrode lead-out portion 401 is coupled to the second electrode 203, and the second electrode lead-out portion 402 is coupled to the first electrode 202.

In this case, the first electrode 202 and the second electrode 203 in the ultrasonic emission structure 20 can be led out to the side, proximate to the ultrasonic emission structure 20, of the protective layer 40, so that the coupling between the ultrasonic emission structure 20 and other devices is facilitated.

In some embodiments, the protective layer 40 may be a glass substrate, or a flexible substrate, such as a flexible substrate made of a polyimide (PI) material. The side, proximate to the ultrasonic receiving structure 30, of the protective layer 40 may also be provided with an optically clear adhesive (OCA) layer. In an actual process, the ultrasonic emission structure 20 may be manufactured on the protective layer 40, and then the protective layer 40 is attached to the ultrasonic receiving structure 30 through the OCA.

The ultrasonic emission structure 20 includes a first electrode 202 and a second electrode 203. The first electrode 202 and the second electrode 203 are respectively distributed on two sides of the first piezoelectric film layer 201. The side, proximate to the ultrasonic emission structure 20, of the protective layer 40 is provided with the first electrode lead-out portion 401 and the second electrode lead-out portion 402. The first electrode lead-out portion 401 is coupled to the second electrode 203, so that the first electrode lead-out portion 401 can lead out the second electrode 203. The second electrode lead-out portion 402 is coupled to the first electrode 202, so that the second electrode lead-out portion 402 can lead out the first electrode 202.

During specific implementation, the first electrode lead-out portion 401 and the second electrode lead-out portion 402 may be respectively disposed at two ends of the side, proximate to the ultrasonic emission structure 20, of the protective layer 40.

Alternatively, the lead-out ends of the first electrode 202 and the second electrode 203 on the ultrasonic emission structure 20 may be located on the same side of the first piezoelectric film layer 201, and may also be respectively located on two sides of the first piezoelectric film layer 201. According to different arranging positions of the lead-out ends of the first electrode 202 and the second electrode 203, the ultrasonic emission structure 20 at least has the following two lead-out manners, which will be described in detail below in conjunction with the accompanying drawings.

The First Lead-Out Manner.

Figure 4:
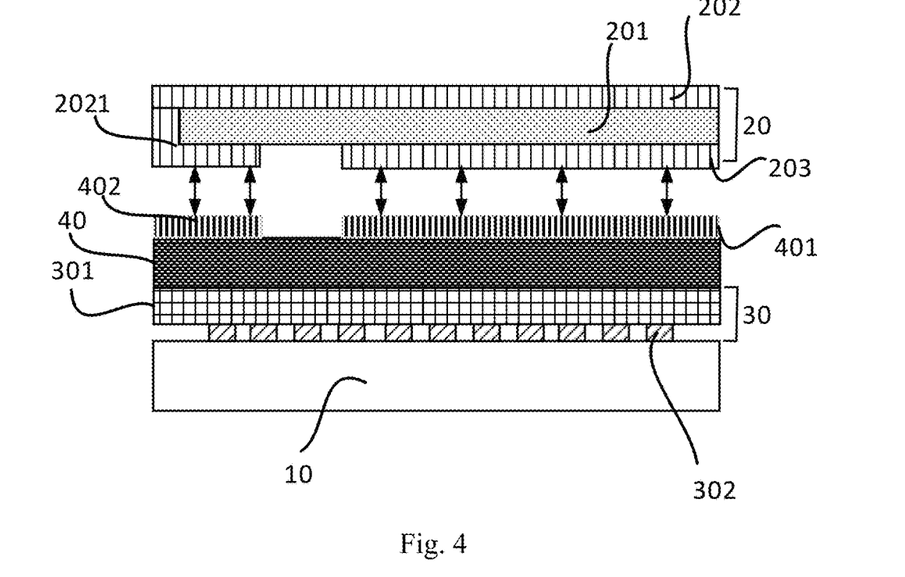
FIG. 4 is a sectional schematic diagram of an ultrasonic sensor provided by the embodiments of the present disclosure.

Referring to FIG. 4, the ultrasonic emission structure 20 may further include: a first conductive connection portion 2021 coupled to the first electrode 202.

One end of the first conductive connection portion 2021 is coupled to the first electrode 202, and the other end of the first conductive connection portion 2021 extends to the side, proximate to the bearing substrate 10, of the first piezoelectric film layer 201 and is in direct contact with and coupled to the second electrode lead-out portion 402. The first conductive connection portion 2021 is insulated from the second electrode 203.

The second electrode 203 is in direct contact with and coupled to the first electrode lead-out portion 401.

That is, the lead-out end of the first electrode 202 is the part, located on the side of the first piezoelectric film layer 201 proximate to the bearing substrate 10, of the first conductive connection portion 2021, and the lead-out end of the second electrode 203 is the surface of the side, proximate to the bearing substrate 10, of the second electrode 203. That is, the lead-out ends of the first electrode 202 and of the second electrode 203 are located on the same side of the first piezoelectric film layer 201.

The first conductive connection portion 2021 is insulated from the second electrode 203. For example, the first conductive connection portion 2021 may be disposed at a position spaced from the second electrode 203 for a set distance, so as to avoid short circuiting between the first electrode 202 and the second electrode 203.

During specific implementation, the first electrode lead-out portion 401 and the second electrode lead-out portion 402 may be made of metal materials. The first electrode lead-out portion 401 is in direct contact with the second electrode 203, and the second electrode lead-out portion 402 is in direct contact with the first conductive connection portion 2021, so that the first electrode 202 is led out to the protective layer 40 by the second electrode lead-out portion 402, and similarly, the second electrode 203 is led out to the protective layer 40 by the first electrode lead-out portion 401.

Specifically, in the ultrasonic sensor provided by the embodiments of the present disclosure, referring to FIG. 4 as well, the first conductive connection portion 2021 may include a silver colloid material. In this way, the first conductive connection portion 2021 can be coupled to the first electrode 202 more easily. Specifically, the first conductive connection portion 2021 may be completely made of the silver colloid material, or, the part, located on the side of the first piezoelectric film layer 201 proximate to the bearing substrate 10, of the first conductive connection portion 2021 is made of a metal material, and the rest part of the first conductive connection portion 2021 is made of the silver colloid material.

In addition, the first conductive connection portion 2021 may also be made of other materials, such as a metal material. In the manufacturing process, the metal material may be used to manufacture part of the first conductive connection portion on the side, proximate to the bearing substrate 10, of the first piezoelectric film layer 201, and then the metal material is used to manufacture the rest part of the first conductive connection portion which is then in contact with the first electrode 202.

The Second Lead-Out Manner

Figure 5:
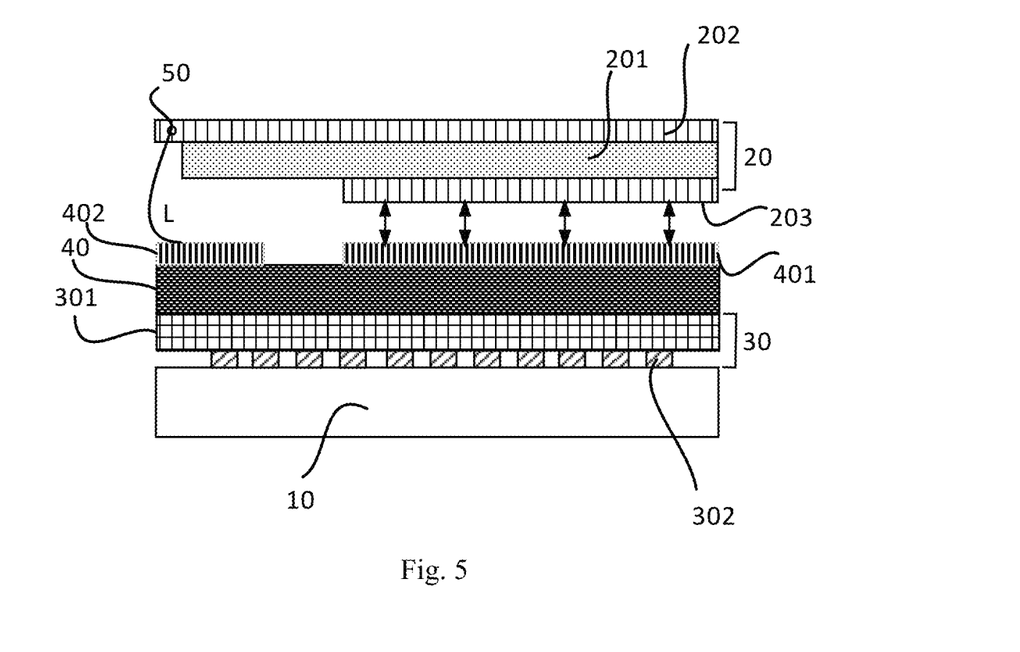
FIG. 5 is a sectional schematic diagram of an ultrasonic sensor provided by the embodiments of the present disclosure.

Referring to FIG. 5, the ultrasonic emission structure 20 further includes: a lead-out wire L.

The edge of the side, proximate to the second electrode lead-out portion 402, of the first electrode 202 exceeds the edge of the first piezoelectric film layer 201, and the edge, exceeding the first piezoelectric film layer 201, of the first electrode 202 is provided with a lead-out hole 50.

One end of the lead-out wire L is coupled to the second electrode lead-out portion 402, and the other end of the lead-out wire L is coupled to the first electrode 202 through the lead-out hole 50.

The second electrode 203 is in direct contact with and coupled to the first electrode lead-out portion 401.

That is, the lead-out end of the first electrode 202 is the end, exceeding the first piezoelectric film layer 201, of the first electrode 202, and the lead-out end of the second electrode 203 is the surface of the side, proximate to the bearing substrate 10, of the second electrode 203. That is, the lead-out ends of the first electrode 202 and of the second electrode 203 are respectively located on two sides of the first piezoelectric film layer 201.

Similarly, the first electrode lead-out portion 401 and the second electrode lead-out portion 402 may be both made of metal materials. The first electrode lead-out portion 401 is in direct contact with the second electrode 203, and a lead-out hole 50 may be reserved in the second electrode 203. The second electrode lead-out portion 402 leads out the first electrode 202 from the lead-out hole 50 through the lead-out wire L.

In a possible implementation, in the ultrasonic sensor provided by the embodiments of the present disclosure, the first electrode 202 and the second electrode 203 include the same metal material; and the first electrode lead-out portion 401 and the second electrode lead-out portion 402 include the same metal material.

In this way, in the manufacturing process, the first electrode lead-out portion 401 and the second electrode lead-out portion 402 may be manufactured by the same manufacturing process, so that the manufacturing cost is reduced.

Further, in the ultrasonic sensor provided by the embodiments of the present disclosure, the first electrode 202 and the first electrode lead-out portion 401 include the same metal material. That is, the first electrode 202, the second electrode 203, the first electrode lead-out portion 401 and the second electrode lead-out portion 402 may include the same metal material. For example, the first electrode 202, the second electrode 203, the first electrode lead-out portion 401 and the second electrode lead-out portion 402 may be all made of silver with good electrical conductivity. The structure shown in FIG. 4 is taken as an example. As shown in the arrows in the figure, the second electrode 203 and the first electrode lead-out portion 401 may be coupled by metal bonding, and the first conductive connection portion 2021 may be coupled with the second electrode lead-out portion 402 by metal bonding, so that ultrasonic signals can be better transmitted.

In addition, the metal materials included in the first electrode 202 and the first electrode lead-out portion 401 may also be different. For example, the first electrode 202 and the second electrode 203 may be made of silver, and the first electrode lead-out portion 401 and the second electrode lead-out portion 402 may be made of molybdenum. The structure shown in FIG. 5 is taken as an example. As shown in the arrows in the figure, the second electrode 203 and the first electrode lead-out portion 401 may be coupled by metal bonding, so that ultrasonic signals can be better transmitted.

Both the first lead-out manner and the second lead-out manner can be used for leading out the electrodes of the ultrasonic emission structure 20 to the protective layer 40, so that other devices can be coupled to the ultrasonic emission structure 20 through the first electrode lead-out portion 401 and the second electrode lead-out portion 402 disposed on the protective layer 40, thereby reducing the use of the lead wire, and facilitating a binding process.

Furthermore, an effective emission region formed by the first electrode 202 and the second electrode 203 at the two sides of the first piezoelectric film layer 201 and an effective receiving region of the second piezoelectric film layer 301 are consistent in area, so that more ultrasonic signals can be transmitted.

The protective layer 40 is disposed between the ultrasonic emission structure 20 and the ultrasonic receiving structure 30, so that the protective layer 40 can be deemed as a carrier for the ultrasonic emission structure 20, thereby facilitating separate manufacturing of the ultrasonic emission structure 20; and then, the protective layer 40 carrying the ultrasonic emission structure 20 is attached to the surface of the ultrasonic receiving structure 30.

Figure 6:
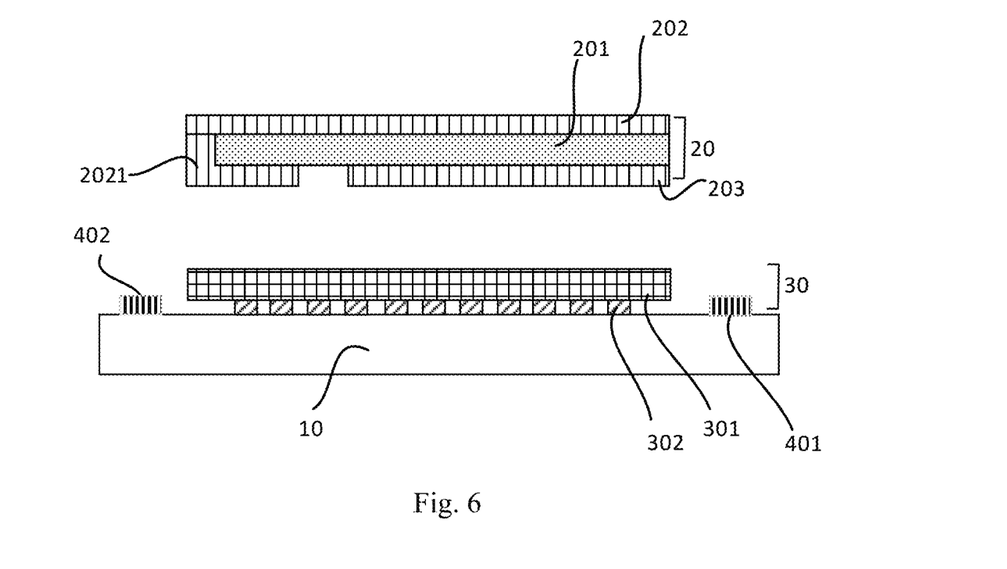
FIG. 6 is a sectional schematic diagram of an ultrasonic sensor provided by the embodiments of the present disclosure.

In addition, in the ultrasonic sensor provided by the embodiments of the present disclosure, as shown in FIG. 6, it is also possible that no protective layer is disposed between the ultrasonic emission structure 20 and the ultrasonic receiving structure 30. In this case, the electrode lead-out end of the ultrasonic emission structure 20 can be disposed on the bearing substrate 10. That is, the bearing substrate 10 is provided with a first electrode lead-out portion 401 used for leading out the second electrode 203 and a second electrode lead-out portion 402 used for leading out the first electrode 202.

Specifically, in the ultrasonic sensor provided by the embodiments of the present disclosure, as shown in FIG. 6, the ultrasonic sensor may further include: a first electrode lead-out portion 401 and a second electrode lead-out portion 402 which are located on the side, proximate to the ultrasonic emission structure 20, of the bearing substrate 10.

The ultrasonic emission structure 20 includes: a first electrode 202 located on the side, away from the bearing substrate 10, of the first piezoelectric film layer 201, and a second electrode 203 located on the side, proximate to the bearing substrate 10, of the first piezoelectric film layer 201.

The first electrode lead-out portion 401 is coupled to the second electrode 203, and the second electrode lead-out portion 402 is coupled to the first electrode 202.

The first electrode lead-out portion 401 and the second electrode lead-out portion 402 are arranged on the side, proximate to the ultrasonic emission structure 20, of the bearing substrate 10, the first electrode lead-out portion 401 is coupled to the second electrode 203, and the second electrode lead-out portion 402 is coupled to the first electrode 202, so that the electrodes of the ultrasonic emission structure 20 can be led out to the surface of the bearing substrate 10 to enable the ultrasonic emission structure 20 to be coupled to other devices conveniently.

Figure 7:
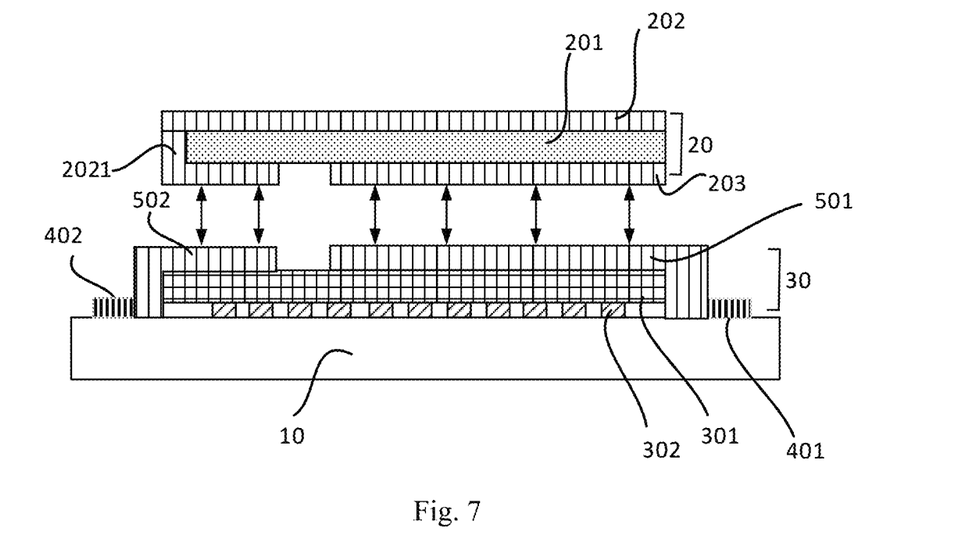
FIG. 7 is a sectional schematic diagram of an ultrasonic sensor provided by the embodiments of the present disclosure.
Figure 8:
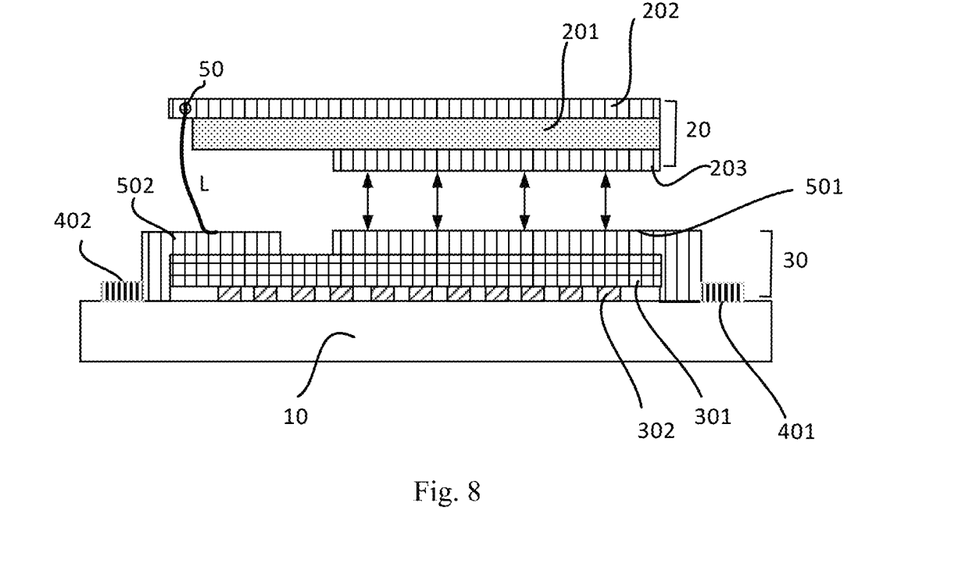
FIG. 8 is a sectional schematic diagram of an ultrasonic sensor provided by the embodiments of the present disclosure.

During specific implementation, in the ultrasonic sensor provided by the embodiments of the present disclosure, as shown in FIG. 7 and/or FIG. 8, the ultrasonic receiving structure may include: a second conductive connection portion 502 located on the side, proximate to the ultrasonic emission structure 20, of the bearing substrate 10.

The ultrasonic receiving structure 30 may further include: a third electrode 501 located on the side, away from the bearing substrate 10, of the second piezoelectric film layer 301, and a plurality of fourth electrodes 302 located on the side, proximate to the bearing substrate 10, of the second piezoelectric film layer 301.

The third electrode 501 is coupled to the first electrode lead-out portion 401, and the third electrode 501 is in direct contact with and coupled to the second electrode 203.

One end of the second conductive connection portion 502 is coupled to the second electrode lead-out portion 402, and the other end of the second conductive connection portion 502 is coupled to the first electrode 202; the second conductive connection portion 502 is insulated from the third electrode 501.

The third electrode 501 is coupled to the first electrode lead-out portion 401, and the third electrode 501 is in direct contact with and coupled to the second electrode 203, so that the second electrode 203 can be led out to the surface of the bearing substrate 10. Furthermore, the first electrode 202 can be coupled to the second electrode lead-out portion 402 through the second conductive connection portion 502, so that the first electrode 202 can be led out to the surface of the bearing substrate 10 to facilitate coupling between the ultrasonic emission structure 20 and other devices.

The second conductive connection portion 502 is insulated from the third electrode 501, so that short circuiting between the first electrode 202 and the second electrode 203 can be avoided.

In the actual application, in the ultrasonic emission phase, a square wave voltage may be applied to the first electrode 202, and a fixed voltage may be applied to the second electrode 203, so as to drive the first piezoelectric film layer 201 to deform to emit ultrasonic waves; and in the ultrasonic receiving phase, a fixed voltage may be applied to the first electrode 202, and a fixed voltage may be applied to the second electrode 203 and the third electrode 501, so that an ultrasonic intensity distribution is obtained by receiving signals fed back by the fourth electrodes 302.

During specific implementation, in the ultrasonic sensor provided by the embodiments of the present disclosure, the second conductive connection portion 502 includes: a material layer located on the side, proximate to the ultrasonic emission structure 20, of the bearing substrate, and a metal layer located on the side, away from the bearing substrate, of the material layer, so that the thickness of the second conductive connection portion 502 is the same as or similar to the thickness of the second piezoelectric film layer 301 and the third electrode 501.

Specifically, in the ultrasonic sensor provided by the embodiments of the present disclosure, the material of the material layer is the same as the material of the second piezoelectric film layer, and the material layer and the second piezoelectric film layer are disposed on the same layer. Therefore, in the manufacturing process, the material layer and the second piezoelectric film layer may be manufactured by the same process, so as to reduce the manufacturing cost. By the arrangement of the material layer, the metal layer can be relatively thin, so that the requirement on the process is relatively low.

Specifically, during the manufacturing of the ultrasonic receiving structure 30, an entire piezoelectric film layer may be manufactured, and then the piezoelectric film layer is patterned to obtain a material layer and a second piezoelectric film layer of which the end surfaces are spaced from each other. Then, an entire metal film layer is manufactured, and the entire metal film layer is patterned to form the third electrode 501 located on the second piezoelectric film layer 301 and the metal layer located on the material layer, instead of separately manufacturing the second conductive connection portion 502, thereby simplifying the manufacturing process.

In addition, during the specific implementation, a metal material may also be used to directly manufacture the second conductive connection portion 502 with the thickness which is the same as or similar to the thickness of the second piezoelectric film layer 301 and the third electrode 501, and there is no limitation here.

In one implementation, in the ultrasonic sensor provided by the embodiments of the present disclosure, as shown in FIG. 7, the ultrasonic emission structure 20 may further include: a first conductive connection portion 2021 coupled to the first electrode 202.

One end of the first conductive connection portion 2021 is coupled to the first electrode 202, and the other end of the first conductive connection portion 2021 extends to the side, proximate to the bearing substrate 10, of the first piezoelectric film layer 201 and is in direct contact with and coupled to the second conductive connection portion 502; the first conductive connection portion 2021 is insulated from the second electrode 203.

By disposing the first conductive connection portion 2021 and the second conductive connection portion 502, coupling between the first electrode 202 and the second conductive connection portion 402 can be realized, so that the first electrode 202 can be led out to the surface of the bearing substrate 10. In an actual technological process, the first conductive connection portion 2021 can be coupled to the second conductive connection portion 502 by metal bonding, and the second electrode 203 can be coupled to the third electrode 501 by metal bonding.

The first conductive connection portion 2021 is insulated from the second electrode 203. For example, the first conductive connection portion 2021 may be disposed at a position spaced from the second electrode 203 for a set distance, so as to avoid short circuiting between the first electrode 202 and the second electrode 203.

Specifically, in the ultrasonic sensor provided by the embodiments of the present disclosure, the first conductive connection portion 2021 may include a silver colloid material. For example, the first conductive connection portion 2021 may completely be made of the silver colloid material, or the part, located on the side of the first piezoelectric film layer 201 proximate to the bearing substrate, of the first conductive connection portion 2021 may be made of the metal material, and the rest part of the first conductive connection portion 2021 is made of the silver colloid material.

In another implementation, in the ultrasonic sensor provided by the embodiments of the present disclosure, as shown in FIG. 8, the ultrasonic emission structure 20 may further include: a lead-out wire L.

The edge of the side, proximate to the second electrode lead-out portion 402, of the first electrode 202 exceeds the edge of the first piezoelectric film layer 201, and the edge, exceeding the first piezoelectric film layer 201, of the first electrode 202 is provided with a lead-out hole 50.

One end of the lead-out wire L is coupled to the second electrode lead-out portion 402 through the second conductive connection portion 502, and the other end of the lead-out wire L is coupled to the first electrode 202 through the lead-out hole 50.

The lead-out hole 50 is reserved in the first electrode 202, and the second electrode lead-out portion 402 leads out the second electrode 203 from the lead-out hole 50 through the lead-out wire L, so that the first electrode 202 is led out to the surface of the bearing substrate 10; and the first electrode lead-out portion 401 is coupled to the second electrode 203 by the third electrode 501, so that the second electrode 203 can be led out to the surface of the bearing substrate 10.

During specific implementation, in the ultrasonic sensor provided by the embodiments of the present disclosure, the first electrode 202 and the second electrode 203 include the same metal material; and the first electrode lead-out portion 401 and the second electrode lead-out portion 402 include the same metal material.

In this way, in the manufacturing process, the first electrode lead-out portion 401 and the second electrode lead-out portion 402 may be manufactured by the same manufacturing process, so that the manufacturing cost is reduced.

Further, in the ultrasonic sensor provided by the embodiments of the present disclosure, the first electrode 202 and the first electrode lead-out portion 401 include the same metal material. That is, the first electrode 202, the second electrode 203, the first electrode lead-out portion 401 and the second electrode lead-out portion 402 are made of the same metal material. For example, the first electrode 202, the second electrode 203, the first electrode lead-out portion 401 and the second electrode lead-out portion 402 may be all made of silver with good electrical conductivity. The structure shown in FIG. 7 is taken as an example. As shown in the arrows in the figure, the second electrode 203 and the third electrode 501 can be coupled by metal bonding, and the first conductive connection portion 2021 and the second conductive connection portion 502 can be coupled by metal bonding, so that ultrasonic signals can be better transmitted.

In addition, the metal materials included in the first electrode 202 and the first electrode lead-out portion 401 may also be different. For example, the first electrode 202 and the second electrode 203 may be made of silver, and the first electrode lead-out portion 401 and the second electrode lead-out portion 402 may be made of molybdenum. The structure shown in FIG. 8 is taken as an example. As shown in the arrows in the figure, the second electrode and the third electrode 501 can be coupled by metal bonding, so that ultrasonic signals can be better transmitted.

Figure 9:
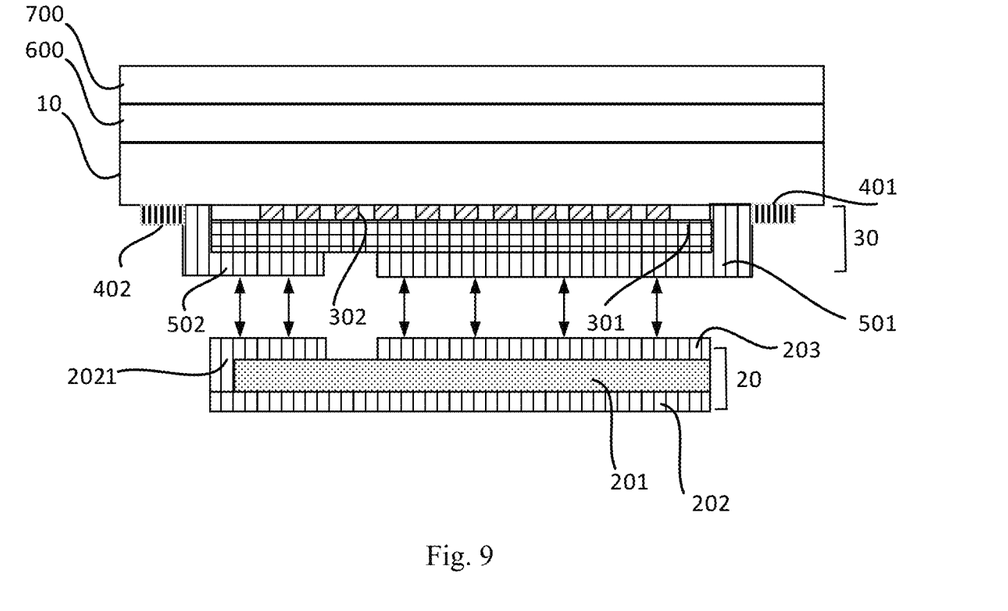
FIG. 9 is a structural schematic diagram of a display panel provided by the embodiments of the present disclosure.

Referring to FIG. 9, based on the same inventive concept, the embodiments of the present disclosure further provide a display panel. The display panel includes a display luminescent device 600, and the above-mentioned ultrasonic sensor located on the side of the display luminescent device away from a display surface. The display luminescent device 600 may be an organic electroluminescence device. The problem solving principle of the display panel is similar to that of the above ultrasonic sensor, so that the implementation of the display panel may refer to the implementation of the above ultrasonic sensor, and repeated parts are not described here.

In an actual manufacturing process, an ultrasonic receiving structure and an ultrasonic emission structure may be manufactured on one side of the bearing substrate, and then the another side of the bearing substrate is attached to the display luminescent device 600. In addition, the above-mentioned ultrasonic sensor may be integrated into the display luminescent device, and there is no limitation to a combination manner of the ultrasonic sensor and the display luminescent device.

By combining the ultrasonic sensor with the display luminescent device, the display panel can be realized with ultrasonic fingerprint identification and touch detection functions; furthermore, effective emission and receiving regions of the ultrasonic sensor are set to be consistent with a display region of the display luminescent device, so that a full-screen fingerprint identification function of the display panel can be realized.

In addition, the display panel may further include other necessary devices. For example, the display panel may further include: a glass cover plate 700 located on one side of the display surface of the display luminescent device 600, and the like. Descriptions thereof are omitted here.

It should be noted that in FIG. 3 to FIG. 9 in the implementation of the present disclosure, in order to illustrate the specific structures of the ultrasonic receiving structure and the ultrasonic emission structure more clearly, the ultrasonic receiving structure and the ultrasonic emission structure are schematically illustrated to have a certain gap. In the actual application, the ultrasonic receiving structure and the ultrasonic emission structure are in direct contact as shown in FIG. 2.

Based on the same inventive concept, the embodiments of the present disclosure further provide a display apparatus, including the above display panel. The display apparatus may be applied to any product or component having a display function, such as a mobile phone, a tablet computer, a TV set, a display, a notebook computer, a digital photo frame and a navigator. The problem solving principle of the display apparatus is similar to that of the display panel, so that the implementation of the display apparatus may refer to the implementation of the display panel, and repeated descriptions will be omitted.

In conclusion, in the ultrasonic sensor, the display panel and the display apparatus which are provided by the embodiments of the present disclosure, the ultrasonic emission structure uses the first piezoelectric film layer, the ultrasonic receiving structure uses the second piezoelectric film layer, and furthermore, the piezoelectric constant of the first piezoelectric film layer is greater than the piezoelectric constant of the second piezoelectric film layer, so that the ultrasonic sensor has higher emission performance, and the ultrasonic sensor can have a better emission effect. Moreover, in the embodiments of this application, the electrodes of the ultrasonic emission structure are led out to the bearing substrate or the protective layer, so that other devices can be connected to the electrodes of the ultrasonic emission structure directly through the electrode lead-out portions of the bearing substrate or the protective layer, thereby reducing the use of the lead wire, and facilitating a binding process.

Obviously, those skilled in the art can make various changes and modifications to the present disclosure without departing from the spirit and scope of the present disclosure. Therefore, if these changes and modifications of the present disclosure fall within the scope of the claims of the present disclosure and equivalent technologies of the present disclosure, the present disclosure is intended to include these changes and modifications.

What is claimed is:

1. An ultrasonic sensor, comprising: a bearing substrate; an ultrasonic emission structure on the bearing substrate, wherein the ultrasonic emission structure comprises a first piezoelectric film layer; an ultrasonic receiving structure on the bearing substrate, wherein the ultrasonic receiving structure comprises a second piezoelectric film layer; wherein a piezoelectric constant of the first piezoelectric film layer is greater than a piezoelectric constant of the second piezoelectric film layer; and further comprising: a protective layer between the ultrasonic emission structure and the ultrasonic receiving structure; and a first electrode lead-out portion and a second electrode lead-out portion which are on a side, proximate to the ultrasonic emission structure, of the protective layer; wherein the ultrasonic emission structure further comprises: a first electrode on a side, away from the bearing substrate, of the first piezoelectric film layer; and a second electrode on a side, proximate to the bearing substrate, of the first piezoelectric film layer; wherein the first electrode lead-out portion is coupled to the second electrode, and the second electrode lead-out portion is coupled to the first electrode.

2. The ultrasonic sensor according to claim 1, wherein the ultrasonic emission structure and the ultrasonic receiving structure are on a same side of the bearing substrate.

3. The ultrasonic sensor according to claim 2, wherein the ultrasonic emission structure is on a side, away from the bearing substrate, of the ultrasonic receiving structure.

4. The ultrasonic sensor according to claim 1, wherein the ultrasonic emission structure further comprises a first conductive connection portion coupled to the first electrode; wherein: one end of the first conductive connection portion is coupled to the first electrode, and the other end of the first conductive connection portion extends to the side, proximate to the bearing substrate, of the first piezoelectric film layer and is in direct contact with and coupled to the second electrode lead-out portion; the first conductive connection portion is insulated from the second electrode; and the second electrode is in direct contact with and coupled to the first electrode lead-out portion.

5. The ultrasonic sensor according to claim 4, wherein the first conductive connection portion comprises a silver colloid material.

6. The ultrasonic sensor according to claim 4, wherein the ultrasonic emission structure further comprises a lead-out wire; wherein: an edge of a side, proximate to the second electrode lead-out portion, of the first electrode exceeds an edge of the first piezoelectric film layer, and the edge, exceeding the first piezoelectric film layer, of the first electrode is provided with a lead-out hole; one end of the lead-out wire is coupled to the second electrode lead-out portion, and the other end of the lead-out wire is coupled to the first electrode through the lead-out hole; and the second electrode is in direct contact with and coupled to the first electrode lead-out portion.

7. The ultrasonic sensor according to claim 4, wherein the first electrode and the second electrode comprise a same metal material; and the first electrode lead-out portion and the second electrode lead-out portion comprise a same metal material.

8. The ultrasonic sensor according to claim 7, wherein the first electrode and the first electrode lead-out portion comprise a same metal material.

9. The ultrasonic sensor according to claim 3, further comprising:
 a first electrode lead-out portion and a second electrode lead-out portion which are on a side, proximate to the ultrasonic emission structure, of the bearing substrate;
 wherein the ultrasonic emission structure comprises a first electrode on the side, away from the bearing substrate, of the first piezoelectric film layer, and a second electrode on a side, proximate to the bearing substrate, of the first piezoelectric film layer;
 wherein the first electrode lead-out portion is coupled to the second electrode, and the second electrode lead-out portion is coupled to the first electrode.

10. The ultrasonic sensor according to claim 9, wherein the ultrasonic receiving structure comprises: a second conductive connection portion on the side, proximate to the ultrasonic emission structure, of the bearing substrate, a third electrode on a side, away from the bearing substrate, of the second piezoelectric film layer, and a plurality of fourth electrodes on a side, proximate to the bearing substrate, of the second piezoelectric film layer;

wherein the third electrode is coupled to the first electrode lead-out portion, and the third electrode is in direct contact with and coupled to the second electrode; one end of the second conductive connection portion is coupled to the second electrode lead-out portion, and the other end of the second conductive connection portion is coupled to the first electrode; and the second conductive connection portion is insulated from the third electrode.

11. The ultrasonic sensor according to claim 10, wherein the ultrasonic emission structure further comprises a first conductive connection portion coupled to the first electrode;

wherein one end of the first conductive connection portion is coupled to the first electrode, and the other end of the first conductive connection portion extends to the side, proximate to the bearing substrate, of the first piezoelectric film layer and is in direct contact with and coupled to the second electrode lead-out portion; the first conductive connection portion is insulated from the second electrode.

12. The ultrasonic sensor according to claim 11, wherein the first conductive connection portion comprises a silver colloid material.

13. The ultrasonic sensor according to claim 10, wherein the ultrasonic emission structure further comprises a lead-out wire;

wherein an edge of a side, proximate to the second electrode lead-out portion, of the first electrode exceeds an edge of the first piezoelectric film layer, and the edge, exceeding the first piezoelectric film layer, of the first electrode is provided with a lead-out hole;

wherein one end of the lead-out wire is coupled to the second electrode lead-out portion, and the other end of the lead-out wire is coupled to the first electrode through the lead-out hole.

14. The ultrasonic sensor according to claim 10, wherein the second conductive connection portion comprises a material layer on the side, proximate to the ultrasonic emission structure, of the bearing substrate, and a metal layer on a side, away from the bearing substrate, of the material layer.

15. The ultrasonic sensor according to claim 14, wherein a material of the material layer is the same as a material of the second piezoelectric film layer, and the material layer and the second piezoelectric film layer are disposed on a same layer.

16. The ultrasonic sensor according to claim 9, wherein the first electrode and the second electrode comprise a same metal material; and     the first electrode lead-out portion and the second electrode lead-out portion comprise a same metal material.

17. The ultrasonic sensor according to claim 16, wherein the first electrode and the first electrode lead-out portion comprise a same metal material.

18. A display panel, comprising a display luminescent device, and the ultrasonic sensor, according to claim 1, on a side, away from a display surface, of the display luminescent device.

19. A display apparatus, comprising the display panel according to claim 18.

\* \* \* \* \*